(12) United States Patent
Fleischhaker et al.

(10) Patent No.: US 9,006,339 B2
(45) Date of Patent: Apr. 14, 2015

(54) MECHANICALLY STABILIZED POLYAZOLES COMPRISING AT LEAST ONE POLYVINYL ALCOHOL

(75) Inventors: Friederike Fleischhaker, Ludwigshafen (DE); Jörg Belack, Skillman, NJ (US); Oliver Gronwald, Frankfurt (DE)

(73) Assignee: BASF SE (DE)

( * ) Notice: Subject to any disclaimer, the term of this patent is extended or adjusted under 35 U.S.C. 154(b) by 401 days.

(21) Appl. No.: 13/467,485

(22) Filed: May 9, 2012

(65) Prior Publication Data

US 2012/0289654 A1 Nov. 15, 2012

Related U.S. Application Data

(60) Provisional application No. 61/484,237, filed on May 10, 2011.

(51) Int. Cl.
| | |
|---|---|
| C08G 73/22 | (2006.01) |
| C08L 79/06 | (2006.01) |
| C08L 29/04 | (2006.01) |
| C08K 3/24 | (2006.01) |
| C08G 73/06 | (2006.01) |
| C08G 73/08 | (2006.01) |
| C08L 79/04 | (2006.01) |

(52) U.S. Cl.
CPC ............ *C08G 73/22* (2013.01); *C08G 73/0616* (2013.01); *C08G 73/0633* (2013.01); *C08G 73/0694* (2013.01); *C08G 73/08* (2013.01); *C08L 79/04* (2013.01); *C08L 79/06* (2013.01); *C08K 3/24* (2013.01)

(58) Field of Classification Search
CPC ......... C08L 79/04; C08L 29/04; C08G 73/22; C08G 73/0616; C08G 73/0633; C08G 73/0694; C08K 3/24
USPC ............................................. 525/57, 56, 58
See application file for complete search history.

(56) References Cited

U.S. PATENT DOCUMENTS

| 7,883,818 B2 * | 2/2011 | Kiefer et al. ................ 429/483 |
| 2004/0118773 A1 | 6/2004 | Uensal et al. |
| 2004/0131901 A1 | 7/2004 | Yamashita et al. |
| 2005/0256296 A1 | 11/2005 | Kiefer et al. |
| 2006/0078774 A1 * | 4/2006 | Uensal et al. .................. 429/33 |
| 2008/0050514 A1 | 2/2008 | Calundann et al. |
| 2011/0059361 A1 * | 3/2011 | Wilkening et al. ......... 429/218.1 |

FOREIGN PATENT DOCUMENTS

| WO | WO-96/13872 A1 | 5/1996 |
| WO | WO-00/44816 A1 | 8/2000 |
| WO | WO 0044816 A1 * | 8/2000 |
| WO | WO-02/08829 A1 | 1/2002 |
| WO | WO-02/070592 A2 | 9/2002 |
| WO | WO-02/088219 A1 | 11/2002 |
| WO | WO-2004/024797 A1 | 3/2004 |
| WO | WO 2004024796 A1 * | 3/2004 |

* cited by examiner

*Primary Examiner* — Michael M Bernshteyn
(74) *Attorney, Agent, or Firm* — Drinker Biddle & Reath LLP

(57) ABSTRACT

A process for preparing mechanically stabilized polyazoles, comprising the following steps:

I) treating at least one polyazole having at least one amino group in a repeat unit with a solution comprising (i) at least one strong acid and (ii) at least one stabilizing reagent, the total content of stabilizing reagents in the solution being in the range from 0.01 to 30% by weight, II) performing the stabilization reaction directly and/or in a subsequent processing step by heating to a temperature greater than 25° C., the stabilizing reagent used being at least one polyvinyl alcohol.

The polyazoles thus obtainable are notable especially for a high conductivity and a very good mechanical stability. They are therefore especially suitable for applications in fuel cells.

18 Claims, 1 Drawing Sheet

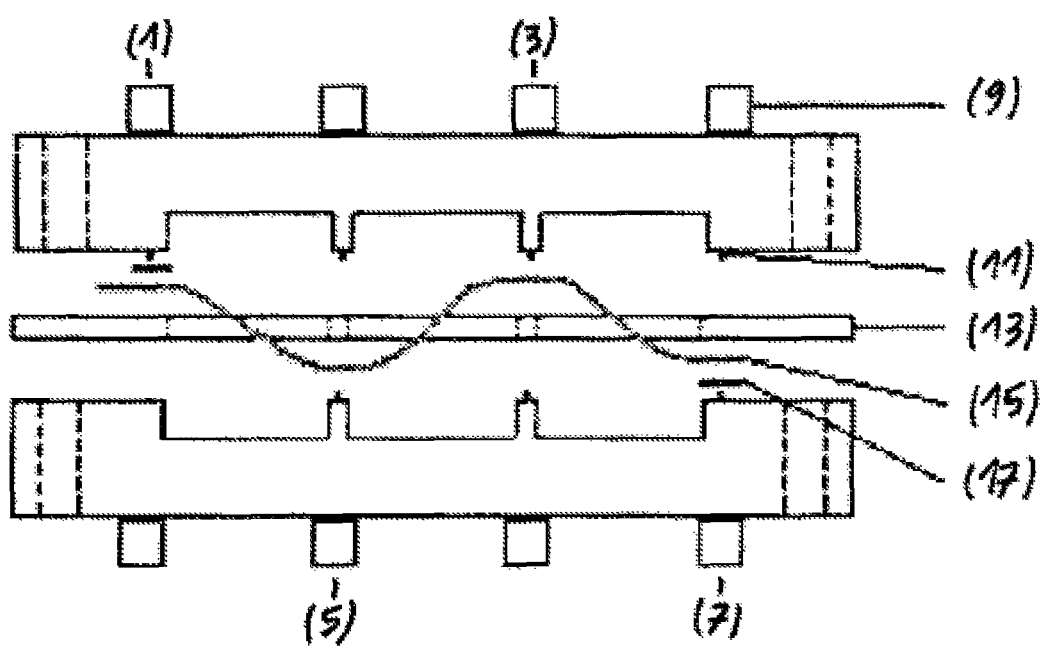

MECHANICALLY STABILIZED POLYAZOLES COMPRISING AT LEAST ONE POLYVINYL ALCOHOL

CROSS-REFERENCE TO RELATED APPLICATIONS

This application claims benefit (under 35 USC 119(e)) of U.S. Provisional Application 61/484,237, filed May 10, 2011, which is incorporated by reference.

The present invention relates to mechanically stabilized polyazoles, especially acid-doped, mechanically stabilized polyazoles, to processes for preparation thereof and to the use thereof in polymer electrolyte membranes (PEMs), membrane electrode assemblies (MEAs) and PEM fuel cells, said use being especially prominent in the context of the present invention. In addition, the mechanically stabilized polyazoles can be used advantageously in many other applications.

Polymer electrolyte membranes (PEMs) are already known and are especially used in fuel cells. Frequently, sulfonic acid-modified polymers, especially perfluorinated polymers, are employed. A prominent example thereof is Nafion™ from DuPont de Nemours, Willmington USA. For proton conduction, a relatively high water content in the membrane is required, which is typically 4-20 molecules of water per sulfonic acid group. The necessary water content, but also the stability of the polymer in conjunction with acidic water and the hydrogen and oxygen reaction gases, limits the operating temperature of the PEM fuel cell stack typically to 80-100° C. Under pressure, the operating temperature can be increased to >120° C. Otherwise, higher operating temperatures cannot be achieved without a loss in performance of the fuel cell.

For system reasons, however, higher operating temperatures than 100° C. in the fuel cell are desirable. The activity of the noble metal-based catalysts present in the membrane electrode assembly (MEA) is significantly better at high operating temperatures. More particularly, in the case of use of what are called reformates from hydrocarbons, distinct amounts of carbon monoxide are present in the reformer gas, which typically have to be removed by complex gas treatment or gas purification. At high operating temperatures, the tolerance of the catalysts to the CO impurities rises up to several % by volume of CO.

In addition, heat evolves in the operation of fuel cells. Cooling of these systems to below 80° C. can, however, be very costly and inconvenient. According to the power output, the cooling apparatuses can be made much simpler. This means that, in fuel cell systems which are operated at temperatures above 100° C., the waste heat can be utilized much better, and hence the fuel cell system efficiency can be enhanced by power-heat coupling.

In order to attain these temperatures, membranes with novel conductivity mechanisms are generally used. One approach for this purpose is the use of membranes which exhibit electrical conductivity without the use of water. A first development in this direction is detailed, for example, in WO 96/13872. For instance, WO 96/13872 discloses the use of acid-doped polybenzimidazole membranes which are produced by a casting process.

A new generation of acid-containing polyazole membranes which likewise exhibit electrical conductivity without the use of water is described in WO 02/088219. The acid-containing polyazole membranes disclosed in WO 02/088219 already exhibit a favorable profile of properties.

Due to the intended applications of PEM fuel cells, however, the mechanical properties of the acid-containing polyazole membranes are in need of constant improvement. For instance, such membranes are still relatively soft and therefore have only limited mechanical durability, and mechanical stability decreases with rising temperature, which can already lead to stability problems in the upper range of the typical operating window (approx. 160° C.-180° C.). It is therefore desirable to improve the mechanical properties, especially the membrane stability, with simultaneously high conductivity.

Mechanical stabilization by bridging or crosslinking reactions is already sufficiently well known in polymer technology. However, a problem here is that, even when a polymer itself has sufficient mechanical stability, it may be the case that the mechanical stability of the polymer, as a result of impregnation/doping with a strong acid for the purpose of imparting proton conductivity, decreases to an inadequate degree.

First approaches for improvement of the mechanical stability of acid-containing polyazole membranes can be found in WO 00/44816 and WO 02/070592. This involves first preparing solutions of the polyazole polymer in an aprotic, polar, organic solvent, and providing the solution with a bridging reagent. After formation of a film, the organic solvent is removed and the bridging reaction is carried out. Subsequently, the film is doped with a strong acid and used. The acid-containing polyazole membranes obtained exhibit an improved mechanical stability compared to unbridged acid-containing polyazole membranes, with simultaneously good conductivity.

However, it has been found that, with the aid of the methods known to date, bridging or crosslinking of polyazole polymers is possible, but the use of aprotic, polar, organic solvents gives rise to new limits. High molecular weight polyazoles in particular are only of limited solubility or are insoluble in the aforementioned organic solvents, and thus cannot be processed.

It was therefore an object of the present invention to indicate better options for mechanical stabilization of polyazoles, preferably of acid-doped polyazoles, especially of acid-doped membranes based on polyazoles. In addition, the good profiles of properties of polyazoles, preferably of acid-doped polyazoles, more preferably of acid-containing polyazole membranes, were to be maintained or even improved, especially with regard to the conductivity. A further aim was an improvement in the compression stability of the polyazoles, preferably of the acid-doped polyazoles, more preferably of the membranes, especially at temperatures in the range from 20° C. to 200° C. In addition, the polyazoles, preferably the acid-doped polyazoles, more preferably the membranes, were to be producible at minimum expense in a comparatively simple manner. Another, final aim was to achieve a solution which is of minimum concern from a health point of view.

These and further objects which are immediately evident from the connections discussed above are achieved by processes having all features of the present claim 1. The dependent claims describe particularly appropriate variants of the process. In addition, the stabilized polymers, membranes and membrane electrode assemblies obtainable by the process, and the preferred fields of application thereof are protected.

The present invention therefore provides a process for preparing mechanically stabilized polyazoles, comprising the following steps:

I) treating at least one polyazole having at least one amino group in a repeat unit with a solution comprising (i) at least one strong acid and (ii) at least one stabilizing reagent, the total content of stabilizing reagents in the solution being in the range from 0.01 to 30% by weight, II) performing the stabilization reaction directly and/or in a subsequent processing step by heating to a temperature greater than 25° C., the stabilizing reagent used being at least one polyvinyl alcohol.

A BRIEF DESCRIPTION OF THE FIGURE

FIG. 1 illustrates a test cell used according to the invention.

The present invention discloses especially advantageous options for the mechanical stabilization of polyazoles, preferably of acid-doped polyazoles, especially of acid-containing and proton-conducting polyazole membranes. The high molecular weight polyazoles known to date were unstabilized; the polyazoles which have been modified by bridging and/or crosslinking and are known to date do not include high molecular weight polyazoles.

In addition, it is possible with the aid of the above invention, for the first time, to obtain polyazoles, especially acid-containing, proton-conducting, high molecular weight polyazole polymers which have an improved modulus of elasticity and improved elongation at break. Both properties are of great significance especially for use in polymer electrolyte membranes for fuel cells.

Furthermore, the conductivities of the inventive polymers, which are preferably in the form of a membrane comprising at least one inventive polymer, are exceptionally high.

In addition, the inventive polymers, which are preferably in the form of a membrane comprising at least one inventive polymer, are notable for an improved compression stability, especially at temperatures in the range from 20° C. to 200° C.

Finally, the solution of the present invention is implementable on the industrial scale and inexpensively in a comparatively simple manner and is absolutely harmless from a health point of view.

Polyazole(s)

Polyazoles in the context of the present invention are understood to mean those polymers in which the repeat unit in the polymer comprises preferably at least one aromatic ring with at least one nitrogen atom. The aromatic ring is preferably a five- or six-membered ring with one to three nitrogen atoms, which may be fused to another ring, especially another aromatic ring. Individual nitrogen heteroatoms may also be replaced by oxygen, phosphorus and/or sulfur atoms. The heterocyclic aromatic rings are preferably in the main polymer chain, but may also be in the side chain. Particular preference is given to those basic polymers which, in the repeat unit, comprise unsaturated five-membered or six-membered aromatic units which comprise, in the ring, 1 to 5 nitrogen atoms or, as well as nitrogen atoms, one or more other heteroatoms.

The inventive polyazoles have at least one amino group in a repeat unit. The amino group may be present as a primary amino group ($NH_2$ group), as a secondary amino group (NH group) or as a tertiary group, which is either part of a cyclic, optionally aromatic structure or part of a substituent on the aromatic unit.

Due to the amino group in the repeat unit, the polymer is basic, and the repeat unit can react preferentially via the amino group with the stabilizing reagent (polyvinyl alcohol). In view of the reactivity toward the stabilizing reagent, the amino group in the repeat unit is preferably a primary or secondary amino group, more preferably a cyclic secondary amino group, which appropriately forms part of the ring of the azole repeat unit.

In a first particularly preferred variant, the process according to the invention comprises the following steps:

a) producing a film comprising at least one polyazole having at least one amino group in a repeat unit,
b) treating the film from step a) with a solution comprising (i) at least one strong acid and (ii) at least one stabilizing reagent, the total content of stabilizing reagents in the solution being in the range from 0.01 to 30% by weight,
c) performing the stabilization reaction in the membrane obtained in step b) directly or in a subsequent membrane processing step, by heating to a temperature greater than 25° C.,
d) optionally additionally doping the membrane obtained in step c) with a strong acid or concentrating the strong acid present by removing water present, the stabilizing reagent used being at least one polyvinyl alcohol.

The production of a film or of a foil comprising polyazoles is already known. The preparation is effected, for example, as described in WO 2004/024797 and comprises the steps of:

A) mixing one or more aromatic tetraamino compounds with one or more aromatic carboxylic acids or esters thereof which contain at least two acid groups per carboxylic acid monomer, or mixing one or more aromatic and/or heteroaromatic diaminocarboxylic acids, in polyphosphoric acid to form a solution and/or dispersion,
B) applying a layer using the mixture from step A) to a support,
C) heating the flat structure/layer obtainable according to step B) under inert gas to temperatures of up to 350° C., preferably up to 280° C., to form the polyazole polymer,
D) hydrolyzing the polymer film formed in step C) (until it is self-supporting),
E) detaching the polymer film formed in step D) from the support,
F) removing the polyphosphoric acid or phosphoric acid present and drying.

The aromatic and heteroaromatic tetraamino compounds used in accordance with the invention are preferably 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetra-aminodiphenyl ether, 3,3',4,4'-tetraaminobenzophenone, 3,3',4,4'-tetra-aminodiphenylmethane and 3,3',4,4'-tetraaminodiphenyldimethylmethane and salts thereof, especially the mono-, di-, tri- and tetrahydrochloride derivatives thereof.

The aromatic carboxylic acids used in accordance with the invention are dicarboxylic acids and tricarboxylic acids and tetracarboxylic acids, or the esters thereof or the anhydrides thereof or the acid chlorides thereof. The term "aromatic carboxylic acids" likewise also comprises heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-amino-isophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoro-terephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or the acid anhydrides thereof or the acid chlorides thereof. The aromatic tri-, tetracarboxylic acids or the C1-C20-alkyl esters or C5-C12-aryl esters thereof or the acid anhydrides thereof or the acid chlorides thereof are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid, benzene-1,2,4,5-tetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used in accordance with the invention are heteroaromatic dicarboxylic acids and tricarboxylic acids and tetracarboxylic acids, or the esters thereof or the anhydrides thereof. Heteroaromatic carboxylic acids are understood to mean aromatic systems which contain at least one nitrogen, oxygen, sulfur or phosphorus atom in the aromatic ring. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also the C1-C20-alkyl esters or C5-C12-aryl esters thereof, or the acid anhydrides thereof or the acid chlorides thereof.

The content of tricarboxylic acid or tetracarboxylic acid (based on the dicarboxylic acid used) is between 0 and 30 mol %, preferably 0.1 and 20 mol %, especially 0.5 and 10 mol %.

The aromatic and heteroaromatic diaminocarboxylic acids used in accordance with the invention are preferably diaminobenzoic acid and the mono- and dihydrochloride derivatives thereof.

Preferably, in step A), mixtures of at least 2 different aromatic carboxylic acids are used. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably 1:50 to 50:1.

These mixtures are especially mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The polyphosphoric acid used in step A) comprises commercial polyphosphoric acids as obtainable, for example, from Riedel-de Haen. The polyphosphoric acids $H_{n+2}P_nO_{3n+1}$ (n>1) typically have a content, calculated as $P_2O_5$ (by acidimetric means) of at least 83%. Instead of a solution of the monomers, it is also possible to produce a dispersion/suspension.

The mixture obtained in step A) has a weight ratio of polyphosphoric acid to the sum of all monomers of 1:10 000 to 10 000:1, preferably 1:1000 to 1000:1, especially 1:100 to 100:1.

The layer is formed in step B) by means of measures known per se (casting, spraying, knife-coating), which are known from the prior art for polymer film production. Suitable supports are all supports which can be described as inert under the conditions. In addition to these inert supports, however, other supports are also suitable, for example polymer films, wovens and nonwovens, which bond with the layer formed in step B) and form a laminate. To adjust the viscosity, phosphoric acid (conc. phosphoric acid, 85%) can optionally be added to the solution. This can adjust the viscosity to the desired value and facilitate the formation of the membrane. The layer obtained in step B) has a thickness matched to the subsequent use and is not subject to any restriction. Typically, the layer formed has a thickness between 1 and 5000 μm, preferably between 1 and 3500 μm, especially between 1 and 100 μm.

The polyazole-based polymer formed in step C), and also the polyazole otherwise used with preference in the context of the present invention, comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV)

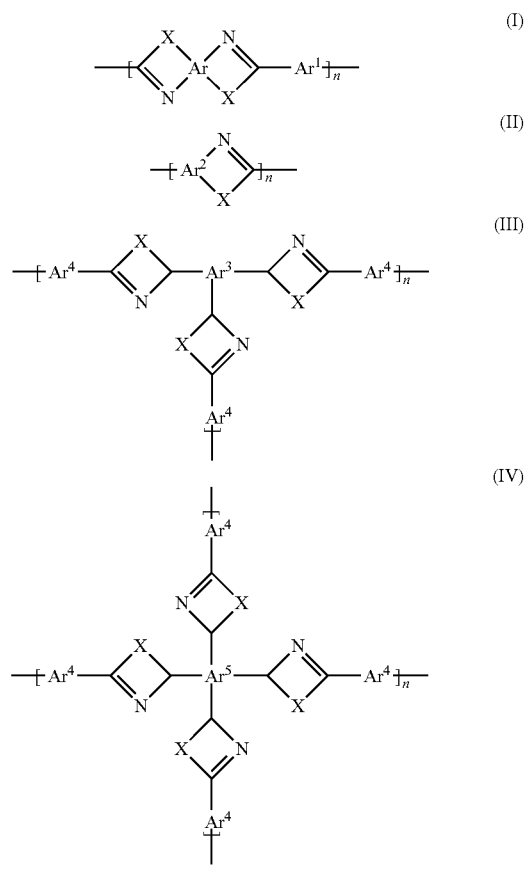

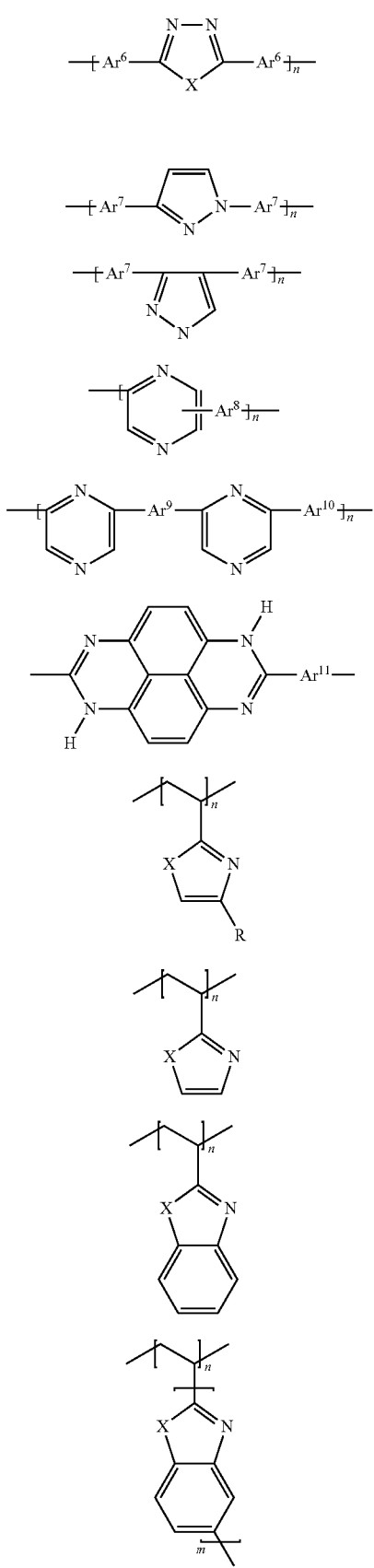

in which

Ar are the same or different and are each a tetravalent aromatic or heteroaromatic group which may be mono- or polycyclic, $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, $Ar^{10}$ are the same or different and are each a di- or trivalent aromatic or heteroaromatic group which may be mono- or polycyclic, $Ar^{11}$ are the same or different and are each a divalent aromatic or heteroaromatic group which may be mono- or polycyclic, X is the same or different and is oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, and n, m are each an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetraazapyrenes).

In a further embodiment of the present invention, the polymer comprising repeat azole units is a copolymer or a blend which comprises at least two units of the formulae (I) to (XIV) which differ from one another. The polymers may be in the form of block copolymers (diblock, triblock), random copolymers, periodic copolymers and/or alternating polymers.

In a particularly preferred embodiment of the present invention, the polymer comprising repeat azole units is a polyazole which comprises only units of the formulae (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

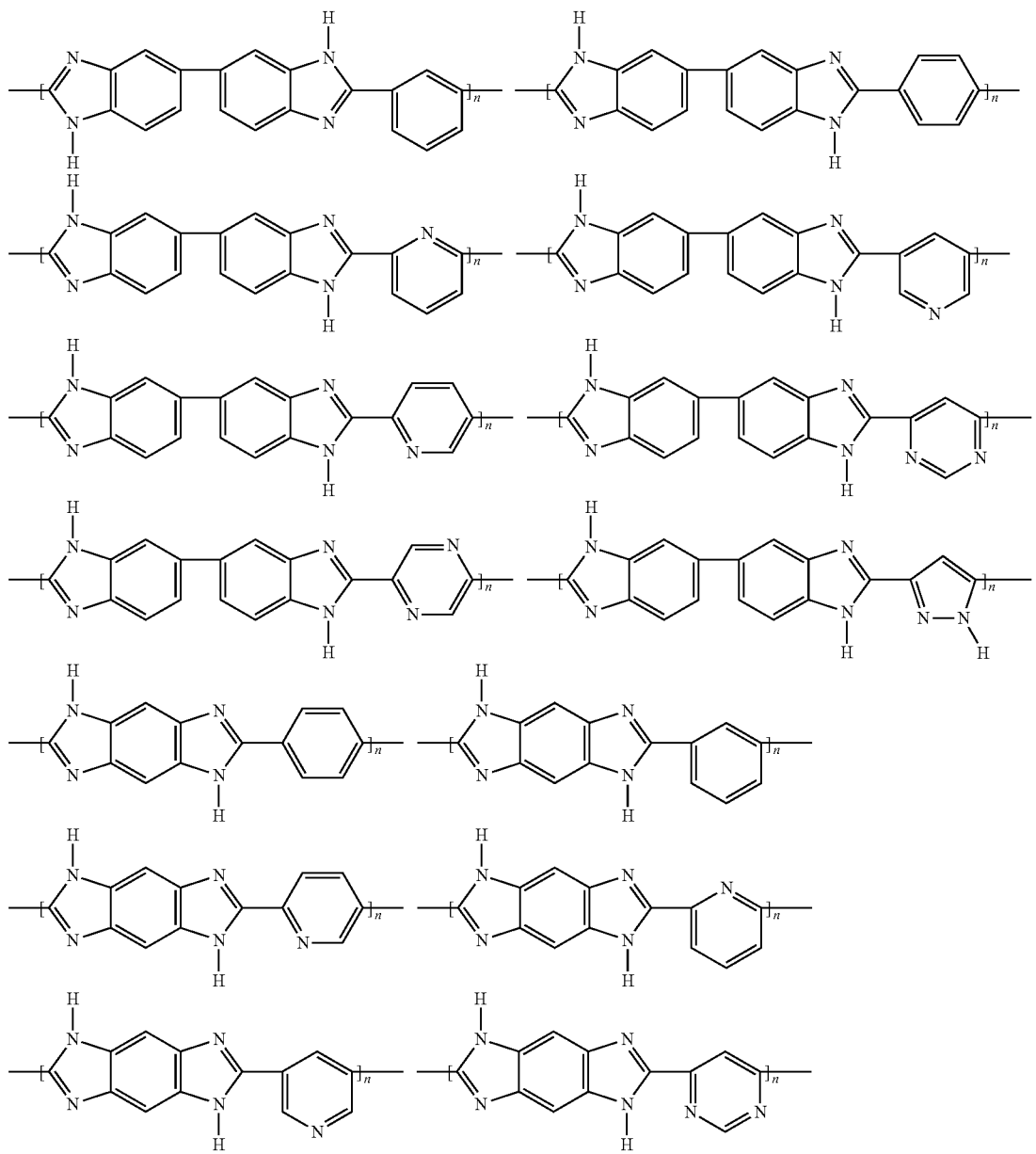

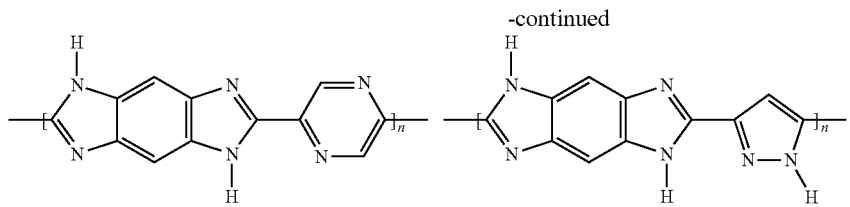
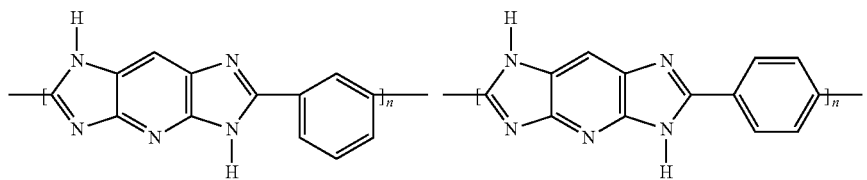
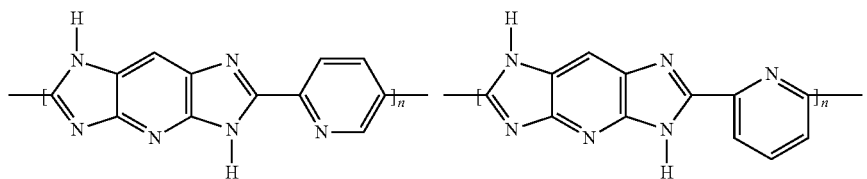
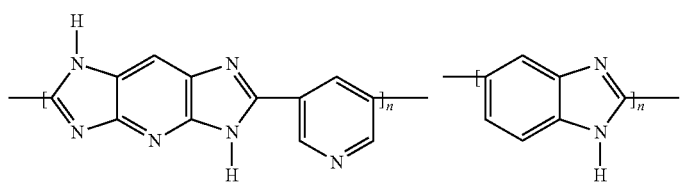
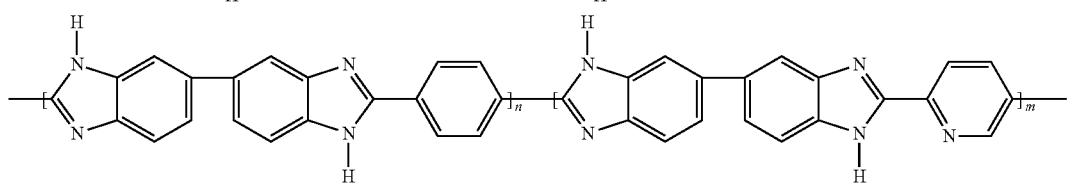
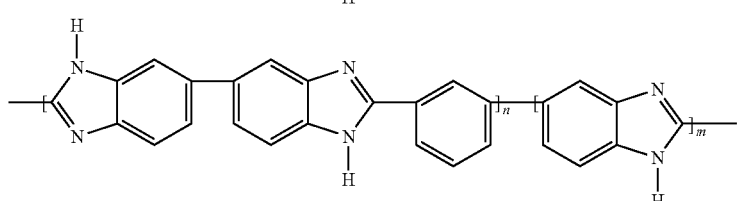
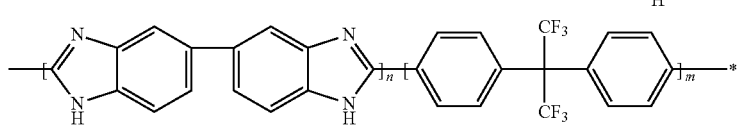
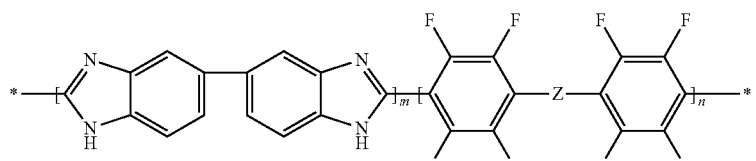
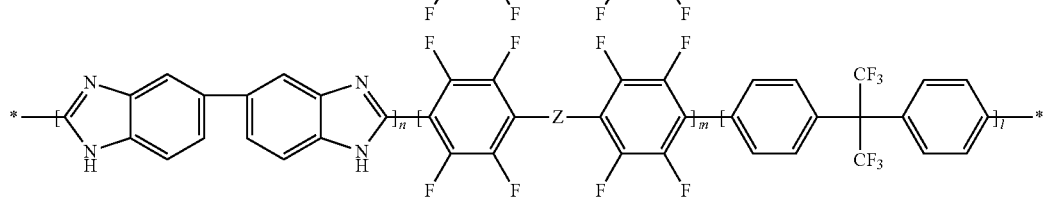

In the last formula, the azole units and the two fluorinated components may be joined to one another in any sequence. The preparation can be effected as a polymer, random copolymer or block copolymer.

In addition, n and m in the above formulae may each independently be an integer greater than or equal to 10, preferably greater than or equal to 100.

The inventive teaching is suitable in principle for all polyazoles irrespective of molecular weight. However, it has been found to be particularly useful for the stabilization of high molecular weight polyazoles which is not obtainable in any other way. High molecular weight polyazoles, but especially polybenzimidazoles, are notable for a high molecular weight which, measured as the intrinsic viscosity, is at least 1.8 dl/g, preferably at least 2.0 dl/g, especially preferably at least 2.5 dl/g. The upper limit is preferably not more than 8.0 dl/g, more preferably not more than 6.8 dl/g, especially preferably not more than 6.5 dl/g. The molecular weight is thus well above that of the commercial polybenzimidazole (IV<1.1 dl/g).

The intrinsic viscosity is determined as described below: for this purpose, the polymer is first dried at 160° C. over the course of 2 h. 100 mg of the polymer thus dried are then dissolved in 100 ml of concentrated sulfuric acid (min. 96% by weight) at 80° C. over the course of 4 h. The inherent or intrinsic viscosity is determined from this solution to ISO 3105 (DIN 51562, ASTM D2515) with an Ubbelohde viscometer at a temperature of 25° C.

When the mixture according to step A) also comprises tricarboxylic acids or tetracarboxylic acid, this achieves branching/crosslinking of the polymer formed along the main chain. This contributes to improvement of the mechanical character.

In one variant of the process, heating of the mixture from step A) to temperatures of up to 350° C., preferably up to 280° C., can already bring about the formation of oligomers and/or polymers. Depending on the temperature and duration selected, it is subsequently possible to partially or entirely dispense with the heating in step C). This variant too is suitable for production of the films required for step a), comprising preferably high molecular weight polyazoles.

It has additionally been found that, in the case of use of aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, the favorable temperature in step C)—or if the formation of oligomers and/or polymers is desired as early as in step A)—is in the range of up to 300° C., preferably between 100° C. and 250° C.

The polymer layer obtained in step C) can be treated to produce the film required for step b) in several ways.

In one variant (variant A), the polyphosphoric acid or phosphoric acid present is left in the membrane since it is not disruptive in the further processing. In this case, the polymer layer produced in step C) is treated in the presence of moisture at temperatures and for a duration sufficient for the layer to possess sufficient strength for the intended end use. The treatment can be effected to such an extent that the membrane is self-supporting, such that it can be detached from the support without damage (step E). Steps D) and E) can also be effected simultaneously or in quick succession. In addition, it is possible to combine steps D) and E) with the measures of steps b), c) and optionally d). For example, the hydrolysis in step D) can be effected by treating the polymer film formed in step C) with the solution comprising (i) at least one strong acid and (ii) at least one stabilizing reagent, where the total content of stabilizing reagents in the solution is in the range of 0.01 to 30% by weight. The performance of the stabilization reaction in step c) can be combined with a thermal drying or concentration of the acid present.

The polymer film is treated in step D) at temperatures above 0° C. and favorably less than 150° C., preferably at temperatures between 10° C. and 120° C., especially between room temperature (20° C.) and 90° C., in the presence of moisture or water and/or water vapor and/or water-comprising phosphoric acid of up to 85%. The treatment is effected preferably under standard pressure, but can also be effected under pressure. It is essential that the treatment occurs in the presence of sufficient moisture, as a result of which the polyphosphoric acid present contributes to reinforcement of the polymer film as a result of partial hydrolysis to form low molecular weight polyphosphoric acid and/or phosphoric acid. As a result of the hydrolysis step, a sol-gel transition occurs, which is found to be responsible for the particular form of the membrane.

The partial hydrolysis of the polyphosphoric acid in step D) leads to a reinforcement of the polymer film, such that it becomes self-supporting, and also leads to a decrease in the layer thickness.

The intra- and intermolecular structures present in the polyphosphoric acid layer according to step B) lead, in step C), to ordered membrane formation which is found to be responsible for the good properties of the polymer film formed.

The upper temperature limit of the treatment in step D) is generally 180° C. In the case of extremely brief action of moisture, for example of extremely superheated steam, this vapor may also be hotter. The essential factor for the upper temperature limit is the duration of the treatment.

The partial hydrolysis (step D) can also be effected in climate-controlled chambers in which the hydrolysis can be controlled under defined action of moisture. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time for the membrane depends on the thickness.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the partial hydrolysis is performed at room temperature (20° C.) with ambient air of relative air humidity of 40-80%, the treatment time is between 1 and 200 hours.

The polymer film obtained in step D) is preferably configured so as to be self-supporting, i.e. it can be detached without damage from the support in step E) and then optionally further processed directly.

To the extent that the polymer film obtained in step C) is further processed on the support, for example to give a composite membrane, it is possible to entirely or partially dispense with step D).

To the extent that the polyphosphoric acid or phosphoric acid present after step C) is left in the membrane (variant A), the treatment of the film in step b) can be performed in a hydrolysis bath analogously to step D). In this case, the polyphosphoric acid or phosphoric acid present in the membrane is replaced completely or at least partially by the solution comprising (i) at least one strong acid and (ii) at least one stabilizing reagent. The stabilization reaction in step c) can be performed in the hydrolysis bath or thereafter, preferably immediately thereafter. According to the stability of the membrane, the treatment in the hydrolysis bath can be effected on a support, or else the support may already have been removed beforehand, such that step E) can optionally be dispensed with or brought forward.

This variant too forms part of the subject matter of the present invention.

In a further variant (variant B), the polyphosphoric acid or phosphoric acid present is removed from the membrane. For this purpose, the polymer layer obtained in step C) is treated in the presence of moisture at temperatures and for a duration sufficient for the layer to have sufficient strength for further handling. Thus, the hydrolysis in step D) and the detachment in step E) can also be effected simultaneously. This simplification of the hydrolysis is possible especially when the polyphosphoric acid or phosphoric acid present is to be removed completely and need not be present for the treatment in step b) since a fresh solution comprising a strong acid is supplied again later in step b).

To the extent that the polyphosphoric acid or phosphoric acid still present in the polymer film is to be removed in step F), this can be accomplished by means of a treatment liquid within the temperature range between room temperature (20° C.) and the boiling temperature of the treatment liquid (at standard pressure).

The treatment liquids used in the context of the invention are solvents which are present in liquid form at room temperature [i.e. 20° C.] and are selected from the group of the alcohols, ketones, alkanes (aliphatic and cycloaliphatic), ethers (aliphatic and cycloaliphatic), glycols, esters, carboxylic acids, where the above group members may be halogenated, water and mixtures thereof.

Preference is given to using C1-C10 alcohols, C2-C5 ketones, C1-C10-alkanes (aliphatic and cycloaliphatic), C2-C6 ethers (aliphatic and cycloaliphatic), C2-C5 esters, C1-C3 carboxylic acids, dichloromethane, water and mixtures thereof.

Subsequently, the treatment liquid introduced in step F) is removed again. This is accomplished preferably by drying, in which case the parameters of temperature and of ambient pressure are selected as a function of the partial vapor pressure of the treatment liquid. Typically, the drying is effected at standard pressure and temperatures between 20° C. and 200° C. Gentler drying can also be effected under reduced pressure. Instead of the drying, it is also possible to dab the membrane dry and hence to free it of excess treatment liquid. The sequence is uncritical.

The film comprising polyazoles can also be produced by means of variation of the above method. In this case, the following steps are carried out:

i) reacting one or more aromatic tetraamino compounds with one or more aromatic carboxylic acids or esters thereof which comprise at least two acid groups per carboxylic acid monomer, or one or more aromatic and/or heteroaromatic diaminocarboxylic acids in the melt at temperatures of up to 350° C., preferably up to 300° C., ii) dissolving the solid prepolymer obtained in step i) in polyphosphoric acid, iii) heating the solution obtainable in step ii) under inert gas to temperatures of up to 300° C., preferably up to 280° C., to form the dissolved polyazole polymer, iv) forming a membrane using the solution of the polyazole polymer according to step iii) on a support and v) treating the membrane formed in step iv) until it is self-supporting.

In addition to the above variation, the formation can also by the following steps:

I) dissolving polymers, especially polyazoles, in polyphosphoric acid,

II) heating the solution obtainable in step I) under inert gas to temperatures of up to 400° C., III) forming a membrane using the solution of the polymer according to step II) on a support and IV) treating the membrane formed in step III) until it is self-supporting.

In both variations, step v) or IV) is followed by steps E) and F), for which both variants A) and B) are also possible.

The preferred embodiments of the particular raw materials and process parameters are already specified for steps A), B), C) and D) and are also valid for this variant.

In a further particularly preferred variant, the process according to the invention comprises the following steps:

A') producing a solution or dispersion of at least one polyazole having at least one amino group in a repeat unit in orthophosphoric acid and/or polyphosphoric acid, B') mixing the solution or dispersion from step A') with a solution comprising
(i) at least one strong acid and
(ii) at least one stabilizing reagent, where the total content of stabilizing reagents in the solution is in the range of 0.01 to 30% by weight, C') performing the stabilization reaction in the solution or dispersion obtained in step B') directly and/or in a subsequent processing step, by heating to a temperature greater than 25° C., D') optionally additionally doping the polymer obtained in step C') with a strong acid or concentrating the strong acid present by removing water present, the stabilizing reagent used being at least one polyvinyl alcohol.

In the context of this variant of the present invention too, the use of the preferred polyazoles already described above is particularly advantageous.

The solution or dispersion can be prepared in step A') by simply mixing the components. Alternatively, the concentration of $H_3PO_4$ and/or polyphosphoric acid-containing compositions with low $P_2O_5$ concentration or the dilution of such compositions with relatively high $P_2O_5$ concentration, i.e. the removal or the supply of water, is also conceivable.

However, it should be noted in this context that, in some cases, especially at low temperatures and/or high solids contents, the dissolution or dispersion of the polyazole in the orthophosphoric acid and/or polyphosphoric acid is kinetically inhibited. The composition is then still present in inhomogeneous form. At higher temperatures greater than 100° C., there is additionally evaporation of water out of the composition, with the result that the concentration of $H_3PO_4$ and/or polyphosphoric acid changes with time.

Appropriately, therefore, the solution or dispersion is prepared in step A') by a process in which a') at least one polyazole is dissolved and/or dispersed in orthophosphoric acid and/or polyphosphoric acid, the concentration of $H_3PO_4$ and/or polyphosphoric acid, calculated as $P_2O_5$ based on the total amount of $H_3PO_4$ and/or polyphosphoric acid and/or water, selected being less than 72.0%, preferably less than 71.7%, even more preferably less than 71.0%, especially less than 70.5%, and b') water is removed from the solution or dispersion from step a') and the concentration of $H_3PO_4$ and/or polyphosphoric acid, calculated as $P_2O_5$ based on the total amount of $H_3PO_4$ and/or polyphosphoric acid and/or water, is increased preferably by at least 0.1%, more preferably by at least 0.5%, especially preferably by at least 1.0%, especially by at least 1.5%.

The solution or dispersion from step a') is generally obtainable in a manner known per se, for example by mixing the components. Further preparation methods are described in WO 02/08829.

More preferably, the solution or dispersion from step a') is obtained by hydrolyzing a solution or dispersion which comprises at least one polyazole and polyphosphoric acid. Such a solution or dispersion can be prepared by polymerizing the aforementioned monomers in polyphosphoric acid.

The solution or dispersion from step a') comprises, based on the total weight thereof, preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dL. The total amount of orthophosphoric acid, water and optionally phosphoric acid is preferably up to 98.2% by weight and is more preferably in the range from 90.0 up to 98.0% by weight, especially in the range from 95.0 to 97.8% by weight.

The water is removed in step b') preferably by evaporation, especially by heating the composition from step a') to more than 100° C. and/or by applying reduced pressure. Particular preference is given to a procedure in which the composition from step a') is heated to a temperature in the range from greater than 120° C. to 240° C., especially in the range from 120° C. to 160° C., appropriately for a time in the range from at least 1 h to at most 48 h, especially in the range from at least 2 h to at most 24 h.

In a further preferred variant of the present invention, the composition is prepared by I') initially charging a solution or dispersion of a polyazole with an intrinsic viscosity, measured in at least 96% by weight sulfuric acid, in the range from 3.0 to 8.0 g/dL, in polyphosphoric acid at a temperature greater than 160° C., preferably greater than 180° C., especially in the range from 180° C. to 240° C., the concentration of $H_3PO_4$ and/or polyphosphoric acid, calculated as $P_2O_5$ (by acidimetric means) based on the total amount of $H_3PO_4$ and/or polyphosphoric acid and/or water, being greater than 72.4%, preferably greater than 73.0%, more preferably greater than 74.0%, even more preferably greater than 75.0%, especially greater than 75.45%, II') adding water, orthophosphoric acid and/or polyphosphoric acid to the solution or dispersion until the mixture has a total amount of $H_3PO_4$ and/or polyphosphoric acid, calculated as $P_2O_5$ (by acidimetric means) based on the total amount of $H_3PO_4$ and/or polyphosphoric acid and/or water, in the range from 70.5% to 75.45%, preferably in the range from 71.0% to 75.0%, more preferably in the range from 71.5% to 74.0%, even more preferably in the range from 71.7% to 73.0%, especially in the range from 72.0% to 72.4%, III') homogenizing the mixture while keeping the total amount of $H_3PO_4$ and/or polyphosphoric acid within the range specified in step II').

The solution or dispersion from step I') is generally obtainable in a manner known per se, for example by mixing the components. Further preparation methods are described in WO 02/08829.

The solution or dispersion from step I') is more preferably obtained by polymerizing the aforementioned monomers in polyphosphoric acid.

The solution or dispersion from step I') comprises, based on the total weight thereof,
preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dL, and
preferably up to 98.2% by weight, more preferably in the range from 90.0 up to 98.0% by weight, especially in the range from 95.0 to 97.8% by weight, of polyphosphoric acid and optionally orthophosphoric acid and/or water.

The polyphosphoric acid used may be commercial polyphosphoric acid as obtainable, for example, from Riedel-de Haen. The polyphosphoric acid $H_{n+2}P_nO_{3n+1}$ (n>1) preferably has a content, calculated as $P_2O_5$ (by acidimetric means), of at least 83%.

The conventional hydrolysis of such compositions leads to compositions with worsened flow behavior, which are no longer processable under standard conditions. Therefore, preference is given to performing steps II') and III').

The addition in step II') can be effected either in portions or continuously.

After the addition, the mixture comprises, based on the total weight thereof,
preferably at least 1.6% by weight, more preferably at least 1.8% by weight, especially in the range from 2.0 to 2.3% by weight, of at least one polyazole with an intrinsic viscosity, measured in at least 96% by weight sulfuric acid, in the range from 3.0 to 8 g/dL, and
preferably up to 98.4% by weight, preferably in the range from 90.0 up to 98.2% by weight, especially in the range from 95.0 to 98.0% by weight, of polyphosphoric acid and optionally orthophosphoric acid and/or water.

As a result of the addition in step II'), an inhomogeneous mixture forms at first. "Inhomogeneous" refers here to a change in the optical or physical properties which alters the equality of a property over the entire extent of the system, or the homogeneity of the appearances of the solution. Typically, the change in the homogeneity of the solution is manifested by interface formation (separation of liquid from the viscous mass), change in the color (typically from green to yellowish), or else the separation of clearly visible particles or solid particles from the smooth solution. The solution is considered to be homogeneous where it appears to be the same as the solution or dispersion of the polyazole in polyphosphoric acid; any differences are merely in viscosity.

The homogenization in step III') is effected preferably in a closed system, for example in an autoclave. It is also particularly favorable to condense any water which evaporates and to supply it back to the mixture, preferably by condensing the evaporating water in at least one reflux condenser which is preferably connected directly to the reaction vessel.

Surprisingly, the solution homogenizes after a certain time, preferably within less than 4 h, especially after no later than 2 h. The solution viscosity of the mixture falls, and an inventive usable composition forms.

In a further particularly preferred embodiment of the present invention, orthophosphoric acid is added in step II').

The process comprising steps A'), B'), C') and D') preferably also serves for production of acid-doped polyazole membranes. For this purpose, the process appropriately comprises the steps of
i) forming a membrane using the polyazole composition from step A'), B'), C') or D') on a support and
ii) treating the membrane formed in step i) until it is self-supporting.

The preferred process parameters for these steps have already been described in detail above and also apply to this variant of the invention.

Further Blend Components

In addition to the aforementioned preferably high molecular weight polyazole, it is also possible to use a blend of one or more preferably high molecular weight polyazoles with a further polymer. The blend component essentially has the task of improving the mechanical properties and of reducing the material costs. A preferred blend component is polyether sulfone as described in US-A-2004/0131901.

The preferred polymers which can be used as blend components include polyolefins such as poly(chloroprene), polyacetylene, polyphenylene, poly(p-xylylene), polyarylmethylene, polyarmethylene, polymethylene, polystyrene, polymethylstyrene, polyvinyl alcohol, polyvinyl acetate, polyvinyl ether, polyvinylamine, poly(N-vinylacetamide), polyvinyl imidazole, polyvinylcarbazole, polyvinylpyrrolidone, polyvinylpyridine, polyvinyl chloride, polyvinylidene chloride, polytetrafluoroethylene, polyhexafluoro-propylene, copolymers of PTFE with hexafluoropropylene, with perfluoropropyl vinyl ether, with trifluoronitrosomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, especially those of norbornene;

polymers having C—O bonds in the backbone, for example polyacetal, polyoxymethylene, polyethers, polypropylene oxide, polyepichlorohydrin, polytetrahydrofuran, polyphenylene oxide, polyether ketone, polyesters, especially polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the backbone, for example polysulfide ethers, polyphenylene sulfide, polyether sulfone; polymers having C—N bonds in the backbone, for example polyimines, polyisocyanides, polyetherimine, polyaniline, polyamides, polyhydrazides, polyurethanes, polyimides, polyazoles, polyazines;

liquid-crystalline polymers, especially Vectra, and inorganic polymers, for example polysilanes, polycarbosilanes, polysiloxanes, polysilicic acid, polysilicates, silicones, polyphosphazenes and polythiazyl.

For use in fuel cells with a sustained use temperature above 100° C., preference is given to those blend polymers which have a glass transition temperature or Vicat softening temperature VST/A/50 of at least 100° C., preferably at least 150° C. and most preferably at least 180° C. Preference is given here to polysulfones with a Vicat softening temperature VST/A/50 of 180° C. to 230° C.

The preferred polymers include polysulfones, especially polysulfone with aromatic rings in the backbone. In a particular aspect of the present invention, preferred polysulfones and polyether sulfones have a melt volume flow rate MVR 300/21.6 less than or equal to 40 $cm^3$/10 min, especially less than or equal to 30 $cm^3$/10 min and more preferably less than or equal to 20 $cm^3$/10 min, measured to ISO 1133.

Further Additives

To further improve the later performance properties, further fillers, especially proton-conducting fillers, can be added to the preferably high molecular weight polyazole.

Nonlimiting examples of proton-conducting fillers are
sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites ($NH_4+$), sheet silicates, framework silicates, H-natrolite, H-mordenite, N $H_4$-analcine, $NH_4$-sodalite, $NH_4$-gallate, H-montmorillonite, other condensation products of orthosalicic acid $Si(OH)_4$ and the salts and esters thereof, polysiloxanes of the general formula $H_3Si$—$(O$—$SiH_2$—$)_n$—$O$—$SiH_3$, and especially also other clay minerals, such as montmorillonites, bentonites, kaolinites, pyrophillites, talc, chlorites, muscovites, mica, smectites, halosites, vermiculites and hydrotalcites.

acids such as $HClO_4$, $SbF_5$ fillers such as carbides, especially SiC, $Si_3N_4$, fibers, especially glass fibers, glass powders and/or polymer fibers, preferably based on polyazoles, also partly crosslinked.

These additives may be present in customary amounts, although the positive properties, such as high conductivity, high lifetime and high mechanical stability of the polyazole, especially of the membrane, should not be impaired too significantly by addition of excessively large amounts of additives. In general, the polyazole, especially of the membrane, comprises at most 80% by weight, preferably at most 50% by weight and more preferably at most 20% by weight of additives. The additives may be present in different particle forms and particle sizes, or else mixtures, but more preferably in the form of nanoparticles.

Stabilization

The polyazole is treated in step I) with a solution comprising (i) at least one strong acid and (ii) at least one stabilizing reagent.

Suitable stabilizing reagents include, in this context, especially all compounds which are capable of mechanically stabilizing the preferably high molecular weight polyazole.

The organic compounds used as stabilizing reagents must have a sufficient stability to the strong acid present in the solution. In addition, they must have a sufficient solubility in the strong acid, such that the total content of stabilizing reagents in the solution in step I) is appropriately in the range from 0.01 to 20% by weight, preferably 0.1 to 15% by weight, more preferably 0.25 to 10% by weight, especially 1 to 5% by weight. To the extent that the stabilizing reagents do not have a sufficient solubility in the strong acid, it is also possible to add small amounts of further inert solubilizers.

Overall, the solubility should appropriately, however, be sufficient for the solution in step I) to be capable of enabling a total content of stabilizing reagent in the range from 0.01 to 100 mol % of the reagent—based on the polyazole present in the film (per repeat unit of the polyazole polymer)—preferably 10 to 80 mol %, especially 15 to 65 mol %.

When the proportion of stabilizing reagent selected is too low, the mechanical strength of the polyazole, especially of the polymer membrane, is not sufficiently improved; when the proportion selected is too high, the polyazole, especially the membrane, becomes brittle and the profile of properties of the polyazole, especially of the membrane, is inadequate.

In addition, incorporation of the electrolyte into the crosslinking reaction is possible. The stabilizing reagent may partly or fully react or interact with the electrolyte. This reaction or interaction likewise results in mechanical and/or chemical stabilization of the membrane, and also stabilization with respect to the phosphoric acid environment. Incorporation of the electrolyte into the stabilizing reaction can lead here to a lowering of the acid strength.

The proton conductivity of the stabilized polyazole, especially of the stabilized membranes, at 160° C. is appropriately between 30 and 300 mS/cm, preferably between 90 and 250 mS/cm.

The proton conductivities are measured by means of impedance spectroscopy (Zahner IM5 or IM6 spectrometer) and a 4-point test cell. A particular procedure is as follows.

For sample preparation, pieces of approx. 3.5*7 cm in size are appropriately cut out, and the membrane samples are rolled a total of 10 times with a roller-shaped weight of 500 g, in order to remove excess acid. The thickness of the samples is favorably determined at 3 points with a Mitutoyo "Absolute, Digmatic" thickness measuring instrument, and averaged (start, middle and end of the sample strip). The sample is appropriately fixed in the test cell as shown in FIG. 1.

The numerals denote:

(1): I_
(3): U_+
(5): U_
(7): I_+
(9): connector
(11): Pt wire
(13): seal
(15): membrane
(17): Pt plate The screws of the test cell are preferably tightened by hand and the cell is favorably transferred into a controlled oven which runs through a temperature-frequency program according to Table 1.

TABLE 1

| Frequency range | Lowest frequency (lower limit) | 1 Hz |
| --- | --- | --- |
| | Highest frequency (upper limit) | 100 kHz |
| | Start frequency (frequency at the start) | 10 kHz |
| Stages per decade | Above 66 Hz | 20 |
| | Below 66 Hz | 5 |
| Number of test periods | Above 66 Hz | 10 |
| | Below 66 Hz | 4 |

The oven program is started, and impedance spectra are measured with a Zahner-Elektrik IM6 impedance spectrometer with a 4-point dry test cell at 20° C. to 160° C. and—in reverse—from 160° C. to 20° C., preferably in 20° C. steps, favorably with a hold time of 10 min before the measurement. The spectrum is saved and preferably evaluated by the literature method of Bode and Niquist. The proton conductivity is calculated here by:

$$\sigma = \frac{l}{R \cdot b \cdot d} \left[ \frac{S}{cm} \right]$$

l (distance between the contacts)=2 cm, b (membrane width)=3.5 cm, d=membrane thickness (cm), R=resistance measured (ohms)

In the context of the present invention, at least one polyvinyl alcohol is used as a stabilizing reagent.

Polyvinyl alcohols preferred in this context comprise, based in each case on the total weight thereof, the following structural units:

a.) 1.0 to 100.0% by weight, appropriately 1.0 to 99.9% by weight, of structural units of the formula (1)

(1)

b.) 0 to 99.0% by weight of structural units of the formula (2)

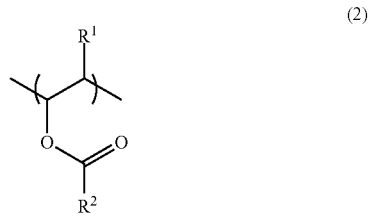

(2)

c.) 0 to 70.0% by weight, preferably 0.01 to 70.0% by weight, especially 1.0 to 60.0% by weight, of structural units of the formula (3)

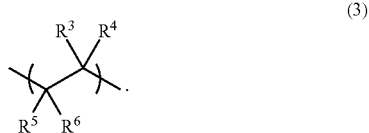

(3)

The respective structural units are of course different than one another; more particularly, in the context of the present invention, the structural unit of the formula (3) does not comprise the structural units of the formula (1) or (2).

The $R^1$ radical is in each case independently hydrogen or methyl, preferably hydrogen.

The $R^2$ radical denotes hydrogen or an alkyl radical having 1 to 6 carbon atoms, preferably an alkyl radical having 1 to 6 carbon atoms, appropriately a methyl, ethyl, n-propyl, isopropyl, n-butyl, sec-butyl, tert-butyl, n-pentyl or an n-hexyl group, advantageously a methyl or ethyl group, especially a methyl group.

The $R^3$, $R^4$, $R^5$ and $R^6$ radicals are each independently radicals having a molecular weight in the range from 1 to 500 g/mol, appropriately hydrogen, an optionally branched aliphatic or cycloaliphatic radical having 1 to 16 carbon atoms, which may optionally contain one or more carboxylic acid, carboxylic anhydride, carboxylic ester, carboxamide and/or sulfonic acid groups.

Particularly preferred structural units of the formula (3) derive from straight-chain or branched olefins having 2 to 18 carbon atoms, (meth)acrylic acid, maleic acid, maleic anhydride, fumaric acid, itaconic acid, (meth)acrylamides and/or ethylenesulfonic acid. It has been found that olefins, especially those having a terminal C—C double bond, which have preferably 2 to 6 carbon atoms, especially ethylene, are very particularly favorable. In addition, structural units (3) which derive from acrylamidopropenylsulfonic acid (AMPS) also lead to very particularly advantageous results in accordance with the invention.

In a further particularly preferred embodiment of the present invention, the polyvinyl alcohol comprises, based in each case on the total weight thereof, greater than 50.0% by weight, appropriately greater than 60.0% by weight, advantageously greater than 70.0% by weight, especially greater than 80.0% by weight, of structural units of the formula (1) and/or (2). Particularly advantageous results can be achieved with polyvinyl alcohols which, based on the total weight thereof, comprise greater than 85.0% by weight, appropriately greater than 90.0% by weight, advantageously greater than 95.0% by weight, especially greater than 99.0% by weight, of structural units of the formula (1) and/or (2). It has been found to be very particularly favorable in accordance with the invention that the polyvinyl alcohol comprises more than 50.0% by weight, appropriately more than 60.0% by weight, advantageously more than 70.0% by weight, preferably more than 80.0% by weight, more preferably more than 90.0% by weight, especially more than 95.0% by weight, of structural units of the formula (1).

The molecular weight of the polyvinyl alcohol is of minor importance in accordance with the invention; in principle, it is possible to use either low molecular weight or high molecular weight polyvinyl alcohols. Nevertheless, it has been found to be very particularly favorable in the context of the present invention that the polyvinyl alcohol has a molar mass ($M_W$) in the range from 10 000 g/mol to 200 000 g/mol, preferably in the range from 20 000 g/mol to 100 000 g/mol, especially in the range from 30 000 g/mol to 50 000 g/mol.

The polyvinyl alcohols to be used in accordance with the invention can be prepared in a manner known per se in a two-stage process. In a first step, for example, the appropriate vinyl ester is free-radically polymerized in a suitable solvent, generally water or an alcohol, such as methanol, ethanol, propanol and/or butanol, using a suitable free-radical initiator. When the polymerization is performed in the presence of free-radically copolymerizable monomers, the corresponding vinyl ester copolymers are obtained.

The vinyl ester (co)polymer is then hydrolyzed in a second step, typically by transesterification with methanol, it being possible to control the degree of hydrolysis in a manner known per se, for example by varying the catalyst concentration, the reaction temperature and/or the reaction time. For further details, reference is made to the standard specialist literature, especially to Ullmann's Encyclopedia of Industrial Chemistry, Fifth Edition on CD-Rom Wiley-VCH, 1997, Keyword: Poly(Vinyl Acetals) and the references cited therein.

The stabilization of the polyazole in step II is effected by heating to a temperature greater than 25° C., preferably greater than 50° C., more preferably greater than 100° C., appropriately to a temperature in the range from greater than 100° C. to 180° C., especially to a temperature in the range from 120° C. to 160° C., favorably for a period of 5 minutes to 120 minutes, preferably 15 minutes to 100 minutes, more preferably 60 minutes. Optionally, the stabilized film can be postconditioned at temperatures of 20° C. to 80° C., more preferably 60° C., in an acid-containing solution for 10 minutes to 60 minutes.

The strong acid used in accordance with the invention is aprotic acid, preferably phosphoric acid and/or sulfuric acid.

In the context of the present description, "phosphoric acid" is understood to mean polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid and derivatives, especially organic derivatives, such as cyclic organophosphoric acids, and derivatives thereof, such as acid esters. The phosphoric acid, especially orthophosphoric acid, preferably has a concentration of at least 80 percent by weight, more preferably a concentration of at least 90 percent by weight, even more preferably a concentration of at least 95 percent by weight and most preferably a concentration of at least 98 percent by weight, the concentration figures being based on the effective concentration of the acid in the membrane or in the hydrolysis.

For further adjustment for the later use, the stabilization in step II) may be followed by additional doping of the polyazole, especially of a membrane. In this case, the additives mentioned at the outset can be added, or else the degree of doping can be effected by further addition of the strong acids mentioned. In addition, water present can be withdrawn from the polyazole, especially the membrane, for example by concentrating the strong acid present. It is possible to add catalysts required in addition for a stabilization reaction and mixtures of different stabilizing agents of the abovementioned groups.

The present invention further provides a membrane comprising at least one mechanically stabilized polyazole, obtainable by the process according to the invention.

The inventive acid-containing polyazole membrane based on stabilized, preferably high molecular weight polyazole polymers forms an acid-based complex with the acid, and is therefore proton-conducting even without the presence of water. This mechanism, called the Grotthus conductivity mechanism, enables use in high-temperature fuel cells with a sustained operating temperature of at least 120° C., preferably at least 140° C., especially at least 160° C. The inventive membrane can therefore be used as an electrolyte for electrochemical cells, especially fuel cells.

The inventive acid-containing polyazole membrane based on stabilized, preferably high molecular weight polyazole polymers is notable for improved mechanical properties. For instance, an inventive membrane exhibits a modulus of elasticity of at least 3 MPa, appropriately of at least 4 MPa, preferably of at least 5 MPa, more preferably of at least 6 MPa, desirably of at least 7 MPa, especially of at least 8 MPa. In addition, the inventive membranes exhibit an elongation at break of at least 150%, preferably of at least 200%, especially of at least 250%.

The tensile strain properties are preferably determined with a Zwick Z010 standard tensile tester, and the procedure which follows has been found to be useful. The samples are first cut appropriately into strips of width 1.5 cm and length 12 cm. Preferably 2-3 samples are prepared and analyzed per sample, and the results are then averaged. The thickness of the samples is preferably determined with a Mitutoyo Absolute Digmatic thickness measuring instrument at 3 points and averaged (preferably at the start, middle and end of the strip). The measurement is preferably carried out as follows. The sample strip is clamped and held at an initial force of 0.1 N for 1 min. Subsequently, the measurement is carried out automatically at a pulling speed of preferably 5 mm/min, preferably at RT (25° C.), until the modulus of elasticity (MPa) has been determined (automatic procedure by means of the Zwick Software TextExpert (Version 11). Thereafter, measurement is continued with a pulling speed of preferably 30 mm/min until the sample strip tears. After the measurement has ended, the fracture toughness ($kJ/m^2$) and the elongation at break (%) are determined.

The conductivity of the inventive acid-containing polyazole membranes based on stabilized, preferably high molecular weight polyazole polymers is preferably at least 50 mS/cm, more preferably at least 100 mS/cm, especially at least 150 mS/cm.

The inventive acid-containing polyazole membranes based on stabilized, preferably high molecular weight polyazole polymers are additionally notable for an increased stability in the case of use as a proton-conducting membrane in high-temperature fuel cells. In the case of operation of such systems, it has been found that, especially in the case of phosphoric acid systems, the stability of the acid-containing polyazole membranes should be improved further. The inventive membranes are notable for such an improved stability and are preferably insoluble in 99% phosphoric acid over the temperature range from 85° C. to 180° C. In this context, "insoluble" means that swelling does not exceed 300% and no dissolution of the self-supporting film occurs in an excess of the acid present.

In addition, the inventive acid-containing polyazole membranes based on stabilized, preferably high molecular weight polyazole polymers have improved compressibility. The relative decrease in membrane thickness is typically less than 40% at 160° C., 120 min according to the Weiser Imprint Test, compared to approx. 80% relative decrease in membrane thickness for a corresponding unstabilized membrane under the same conditions. The Weiser Imprint Test for determination of compressibility is appropriately conducted as follows:

To determine the characteristic membrane indentation performance, membrane samples with an area of 4.91 $cm^2$ (diameter 2.5 cm) are punched out and placed on a hotplate with a Kapton film as a substrate. A metal die guided by metal guides and having three studs (d=1 mm) is placed onto the membrane sample, and the decrease in thickness of the membrane sample is recorded with a Mitutoyo DC III thickness measuring instrument at a hotplate temperature of 160° C. over the course of 120 minutes. The thicknesses measured are normalized to the starting thickness and plotted as a graph against time.

The inventive stabilized membranes are additionally notable for an improved long-term stability.

Additional applications also include use as an electrolyte for a display element, an electrochromic element or various sensors.

The present invention further provides for the preferred use of the inventive polymer electrolyte membrane in a single cell (MEA) for a fuel cell.

The single cell for a fuel cell comprises at least one inventive membrane and two electrodes, between which the proton-conducting membrane is arranged in a sandwich-manner.

The electrodes each have a catalytically active layer and a gas diffusion layer for supplying a reaction gas to the catalytically active layer. The gas diffusion layer is porous, in order that reactive gas can pass through it.

The inventive polymer electrolyte membrane can be used as an electrolyte membrane. It is also possible to produce the electrolyte membrane and a precursor for a single cell (MEA) with one or both catalytically active layers. In addition, the single cell can also be produced by fixing the gas diffusion layer on the precursor.

The present invention further provides a fuel cell comprising a plurality of single cells (MEAs), each of which comprises a membrane produced by the above process and two electrodes, between which the membrane is arranged in a sandwich-like manner.

The inventive stabilization can also be performed after production of an MEA from a membrane. For this purpose, doping of the membrane with the stabilizing agent takes place as described above. The stabilization reaction in step II) or c) or the activation of the stabilizing component, however, takes place subsequently within the MEA arranged in the manner of a sandwich.

More preferably, the stabilization takes place at a temperature in the range from greater than 100° C. to 180° C., especially in the range from 120° C. to 160° C. The reaction time is from a few minutes up to several hours, according to the reactivity of the reagent. The stabilization reaction in an MEA can be performed in one or more stages (temperature ramp).

The invention is illustrated further hereinafter by several examples, without any intention that this should impose a restriction of the inventive concept.

EXAMPLE 1

Performance of an Inventive Stabilization (Route 1)

About 800 ml of a preferably 1-5% by weight solution of a polyvinyl alcohol in preferably 50%-85% phosphoric acid are prepared in a 1000 ml Schott Duran glass bottle.

A piece of approx. A5 size of a standard polyazole membrane with a thickness of 350 µm (CD114), a phosphoric acid concentration of approx. 50% by weight and solids content of polyazole approx. 5% by weight is added to the solution of $H_3PO_4$, heated to 60° C., with 1-5% by weight of the polyvinyl alcohol. The residence time in the solution is 1 h. The membrane is subsequently removed from the solution and treated between 2 support materials preferably between 120-160° C. in an oven for 1 h. After stabilization has been performed, the membrane is placed into 50% phosphoric acid for a period of preferably 15-30 min.

EXAMPLE 2a

Performance of an Inventive Stabilization (Route 2.1)

Preferably 1-5% by weight of a polyvinyl alcohol is stirred into a solution consisting of preferably 2.0-2.5% by weight of a high molecular weight polyazole in preferably 99-103% phosphoric acid, and the mixture is heated at preferably 80-120° C. while stirring for 1 h.

Subsequently, the reaction solution is used to obtain, using a coating knife, a membrane of thickness approx. 350 µm. The latter is treated between 2 support materials preferably between 120-160° C. in an oven for 30 min. After stabilization has been performed, the membrane is placed into 50% phosphoric acid for a period of preferably 15-30 min.

EXAMPLE 2b

Performance of an Inventive Stabilization (Route 2.2)

Preferably 1-5% by weight of a polyvinyl alcohol is stirred into a solution consisting of preferably 2.0-2.5% by weight of a high molecular weight polyazole in preferably 99-103% phosphoric acid, and the mixture is heated at preferably 80-120° C. while stirring for 1 h.

Subsequently, the reaction solution is used to obtain, using a coating knife, a membrane of thickness approx. 350 µm. The latter is placed in 50% phosphoric acid for a period of preferably 15-30 min. Subsequently, the membrane is removed from the solution and treated between 2 support materials preferably between 120-160° C. in an oven for 30 min.

For the 5% by weight use of a polyvinyl alcohol (Mw: 30 000-50 000), at a stirring temperature of 80° C. and an oven temperature of 160° C., the following properties are achieved by route 2.1:

insolubility of the membrane in 99% phosphoric acid at 160° C., proton conductivity at 160° C.: 141.2 mS/cm compressibility: relative decrease in membrane thickness at 160° C.<30% after 120 min (Weiser Imprint Test)

For the 5% by weight use of a polyvinyl alcohol (Mw: 30 000-50 000), in 50% phosphoric acid and at an oven temperature of 120° C., the following properties are achieved by route 1:

insolubility of the membrane in 99% phosphoric acid at 160° C., proton conductivity at 160° C.: 148.6 mS/cm compressibility: relative decrease in membrane thickness at 160° C.<30% after 120 min (Weiser Imprint Test)

For comparison: unstabilized polyazole-phosphoric acid membrane:

solubility of the membrane in 99% phosphoric acid at 160° C., proton conductivity at 160° C.: 120 mS/cm compressibility: relative decrease in membrane thickness at 160° C. approx. 80% after 120 min (Weiser Imprint Test)

The invention claimed is:

1. A process for preparing mechanically stabilized polyazoles comprising the following steps:

I) treating at least one polyazole having at least one amino group in a repeat unit with a solution comprising (i) at least one strong acid and (ii) at least one stabilizing reagent, the total content of stabilizing reagents in the solution being in the range from 0.01 to 30% by weight, II) performing the stabilization reaction directly and/or in a subsequent processing step by heating to a temperature greater than 25° C., the stabilizing reagent used being at least one polyvinyl alcohol and wherein the polyazole has a molecular weight (measured as the intrinsic viscosity) of at least 1.8 dl/g.

2. The process according to claim 1, wherein the solution in step I) comprises at least one strong protic acid.

3. The process according to claim 1, wherein said strong protic acid is based on phosphoric acid and/or sulfuric acid.

4. The process according to claim 3, wherein the phosphoric acid comprises polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid and derivatives thereof.

5. The process according to claim 1, wherein the polyvinyl alcohol, based in each case on the total weight thereof, comprises the following structural units:

a.) 1.0 to 99.9% by weight of structural units of the formula (1)

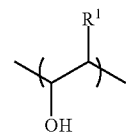

where the $R^1$ radical is in each case independently hydrogen or methyl, b.) 0 to 99.0% by weight of structural units of the formula (2)

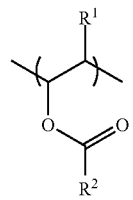

where the $R^2$ radical denotes hydrogen or an alkyl radical having 1 to 6 carbon atoms, c.) 0 to 70.0% by weight of structural units of the formula (3)

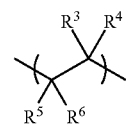

where the $R^3$, $R^4$, $R^3$ and $R^6$ radicals are each independently radicals having a molecular weight in the range from 1 to 500 g/mol.

6. The process according to claim 5, wherein the polyvinyl alcohol, based on the total weight thereof, comprises greater than 50.0% by weight of structural units of the formula (1) and/or (2).

7. The process according to claim 6, wherein the polyvinyl alcohol, based on the total weight thereof, comprises greater than 50.0% by weight of structural units of the formula (1).

8. The process according to claim 1, wherein the polyvinyl alcohol has a molar mass (MW) in the range from 10 000 g/mol to 200 000 g/mol.

9. The process according to claim 1, comprising the following steps:

a) producing a film comprising at least one polyazole having at least one amino group in a repeat unit, b) treating the film from step a) with a solution comprising (i) at least one strong acid and (ii) at least one stabilizing reagent, the total content of stabilizing reagents in the solution being in the range from 0.01 to 30% by weight, c) performing the stabilization reaction in the membrane obtained in step b) directly or in a subsequent membrane processing step, by heating to a temperature greater than 25° C., d) optionally doping the membrane obtained in step c) with a strong acid or concentrating the strong acid present by removing water present, and the stabilizing reagent used being at least one polyvinyl alcohol.

10. The process according to claim 1, comprising the following steps:
   A) producing a solution or dispersion of at least one polyazole having at least one amino group in a repeat unit in orthophosphoric acid and/or polyphosphoric acid,
   B) mixing the solution or dispersion from step A') with a solution comprising
      (i) at least one strong acid and
      (ii) at least one stabilizing reagent, where the total content of stabilizing reagents in the solution is in the range of 0.01 to 30% by weight,
   C') performing the stabilization reaction in the solution or dispersion obtained in step B') directly or in a subsequent processing step, by heating to a temperature greater than 25° C.,
   D') optionally doping the polymer obtained in step C') with a strong acid or concentrating the strong acid present by removing water present,
   and the stabilizing reagent used being at least one polyvinyl alcohol.

11. A membrane comprising at least one mechanically stabilized polyazole obtained by the process according to claim 1.

12. The membrane according to claim 11, which has a solubility of less than 0.5% by weight of polyazole polymer in 99% phosphoric acid within the temperature range from 85° C. to 120° C.

13. A membrane electrode assembly comprising at least one membrane according to claim 11.

14. A process for production of a fuel cell which comprises utilizing the membrane electrode assembly according to claim 13.

15. A fuel cell which comprises the membrane electrode assembly according to claim 13.

16. The process according to claim 1, wherein stabilizing reagents in the solution is in the range of 0.01 to 10% by weight.

17. The process according to claim 1, wherein stabilizing reagents in the solution is in the range of 0.25 to 10% by weight.

18. The process according to claim 1, wherein stabilizing reagents in the solution is in the range of 1 to 5% by weight.

* * * * *